US012070686B2

United States Patent
Tu et al.

(10) Patent No.: US 12,070,686 B2
(45) Date of Patent: Aug. 27, 2024

(54) BARRAGE GENERATION METHOD AND APPARATUS AND COMPUTER-READABLE STORAGE MEDIUM

(71) Applicant: TENCENT TECHNOLOGY (SHENZHEN) COMPANY LIMITED, Shenzhen (CN)

(72) Inventors: Zirui Tu, Shenzhen (CN); Yipeng Yu, Shenzhen (CN); Zixun Sun, Shenzhen (CN); Longyu Lu, Shenzhen (CN); Chengwei Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 214 days.

(21) Appl. No.: 17/673,758

(22) Filed: Feb. 16, 2022

(65) Prior Publication Data

US 2022/0168641 A1    Jun. 2, 2022

Related U.S. Application Data

(63) Continuation of application No. PCT/CN2020/117580, filed on Sep. 25, 2020.

(30) Foreign Application Priority Data

Dec. 31, 2019 (CN) .......................... 201911424409.5

(51) Int. Cl.
*A63F 13/5375* (2014.01)
*A63F 13/837* (2014.01)
*A63F 13/87* (2014.01)

(52) U.S. Cl.
CPC ........ *A63F 13/5375* (2014.09); *A63F 13/837* (2014.09); *A63F 13/87* (2014.09); *A63F 2300/305* (2013.01)

(58) Field of Classification Search
CPC ...... A63F 13/5375; A63F 13/53; A63F 13/87; A63F 2300/305; A63F 2300/572; H04N 21/4788
See application file for complete search history.

(56) References Cited

U.S. PATENT DOCUMENTS

2018/0063501 A1   3/2018   Chen
2018/0227617 A1*  8/2018   Zhu ..................... H04N 21/812
(Continued)

FOREIGN PATENT DOCUMENTS

CN     103078867 A     5/2013
CN     105597321 A     5/2016
(Continued)

OTHER PUBLICATIONS

The State Intellectual Property Office of the People's Republic of China (SIPO) Office Action 1 for for 201911424409.5 Aug. 28, 2020 9 Pages (including translation).
(Continued)

*Primary Examiner* — James S. McClellan
(74) *Attorney, Agent, or Firm* — ANOVA LAW GROUP PLLC

(57) ABSTRACT

A barrage generation method is provided to a computing device. The method includes: obtaining a target game video; determining barrage trigger information according to video content of the target game video; determining a barrage type of a barrage according to the barrage trigger information, and determining a trigger time of the barrage according to the barrage type; and obtaining, according to the barrage trigger information, a barrage text corresponding to the barrage, and triggering the barrage text to generate the barrage at the corresponding trigger time.

20 Claims, 10 Drawing Sheets

(56) References Cited

U.S. PATENT DOCUMENTS

| | | | |
|---|---|---|---|
| 2019/0179852 A1* | 6/2019 | Fei | G06V 20/41 |
| 2019/0222792 A1 | 7/2019 | Cao et al. | |
| 2020/0099988 A1* | 3/2020 | Liu | H04N 21/25883 |
| 2021/0256208 A1* | 8/2021 | Zhou | G06F 40/242 |

FOREIGN PATENT DOCUMENTS

| | | |
|---|---|---|
| CN | 105916043 A | 8/2016 |
| CN | 106792100 A | 5/2017 |
| CN | 107967312 A | 4/2018 |
| CN | 108235105 A | 6/2018 |
| CN | 109819342 A | 5/2019 |
| CN | 109951720 A | 6/2019 |
| CN | 110121083 A | 8/2019 |
| CN | 110166811 A | 8/2019 |
| CN | 110267052 A | 9/2019 |
| CN | 110475140 A | 11/2019 |
| CN | 110740387 A | 1/2020 |
| CN | 111163359 A | 5/2020 |

OTHER PUBLICATIONS

The World Intellectual Property Organization (WIPO) International Search Report for PCT/CN2020/117580 Dec. 25, 2020 5 Pages (including translation).
The Japan Patent Office (JPO) Notification of Reasons for Refusal for Application No. 2022-515478 and Translation Jul. 2, 2024, 35 Pages.

* cited by examiner

BARRAGE GENERATION METHOD AND APPARATUS AND COMPUTER-READABLE STORAGE MEDIUM

RELATED APPLICATION(S)

This application is a continuation application of PCT Patent Application No. PCT/CN2020/117580 filed on Sep. 25, 2020, which claims priority to Chinese Patent Application No. 201911424409.5, entitled "BARRAGE GENERATION METHOD AND APPARATUS AND COMPUTER-READABLE STORAGE MEDIUM" and filed on Dec. 31, 2019, all of which are incorporated by reference in entirety.

FIELD OF THE TECHNOLOGY

The present disclosure relates to the field of computer technologies, and in particular, to a barrage generation method and apparatus and a computer-readable storage medium.

BACKGROUND

With the rapid development of computer technologies, more and more people watch videos through networks, for example, a game video and a live video. When videos are launched and promoted at the initial stage, to attract users and increase stickiness of users, barrages are often automatically inserted into videos.

Barrages in videos are usually generated by a barrage robot intelligently, and the barrage robot sends a limited quantity of barrages in a preset barrage set. Although barrages may be automatically generated in this method, a limited quantity of barrages in a preset barrage set are relatively fixed, resulting in low correlation between generated barrages and videos.

SUMMARY

Embodiments of the present disclosure provide a barrage generation method and apparatus, a computer-readable storage medium, and a computing device.

In one aspect, the present disclosure provides a barrage generation method, executed by a computing device, including: obtaining a target game video; determining barrage trigger information according to video content of the target game video; determining a barrage type of a barrage according to the barrage trigger information, and determining a trigger time of the barrage according to the barrage type; and obtaining, according to the barrage trigger information, a barrage text corresponding to the barrage, and triggering the barrage text to generate the barrage at the trigger time.

In another aspect, the present disclosure provides a barrage generation apparatus, the apparatus including a memory storing computer program instructions; and a processor coupled to the memory and configured to execute the computer program instructions and perform: obtaining a target game video; determining barrage trigger information according to video content of the target game video; determining a barrage type of a barrage according to the barrage trigger information, and determining a trigger time of the barrage according to the barrage type; and obtaining, according to the barrage trigger information, a barrage text corresponding to the barrage, and triggering the barrage text to generate the barrage at the trigger time.

In yet another aspect, the present disclosure provides a non-transitory computer-readable storage medium storing computer program instructions executable by at least one processor to perform: obtaining a target game video; determining barrage trigger information according to video content of the target game video; determining a barrage type of a barrage according to the barrage trigger information, and determining a trigger time of the barrage according to the barrage type; and obtaining, according to the barrage trigger information, a barrage text corresponding to the barrage, and triggering the barrage text to generate the barrage at the trigger time.

Other aspects of the present disclosure can be understood by those skilled in the art in light of the description, the claims, and the drawings of the present disclosure.

Details of one or more embodiments of the present disclosure are provided in the subsequent accompanying drawings and descriptions. Other features, objectives, and advantages of the present disclosure become apparent from the present disclosure, the drawings, and the claims.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

Figure 1:
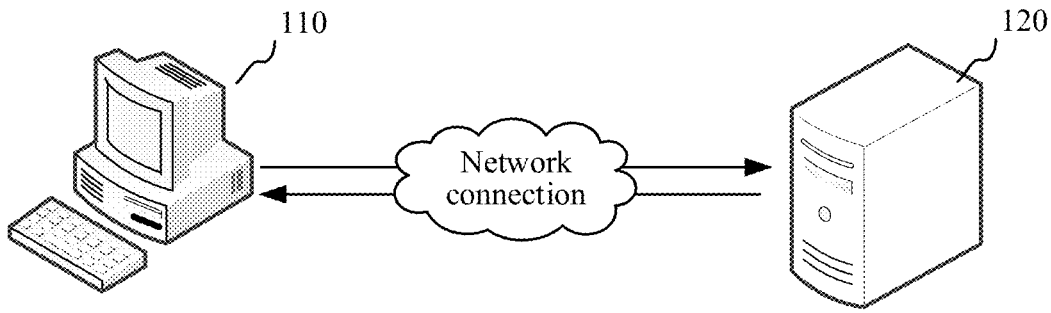
FIG. 1 is a schematic diagram of an implementation environment of a barrage generation method according to one or more embodiments of the present disclosure.

FIG. 1 is a diagram of an implementation environment of a barrage generation method according to an embodiment. Referring to FIG. 1, the barrage generation method is applied to a barrage generation system. The barrage generation system includes a terminal 110 and a server 120. The terminal 110 and the server 120 are connected through a network. The terminal 110 may be a desktop terminal or a mobile terminal, and the mobile terminal may be at least one of a mobile phone, a tablet computer, and a notebook computer. The server 120 may be implemented by an independent server or a server cluster including a plurality of servers. Both the terminal 110 and the server 120 may be configured to separately execute the barrage generation method provided in the embodiments of the present disclosure. The terminal 110 and the server 120 may alternatively be configured to execute the barrage generation method provided in the embodiments of the present disclosure in coordination with each other.

In certain embodiments, the term "barrage" may be referred to as a pop-up window, a pop-up screen, a bullet window, or a bullet screen.

Figure 2:
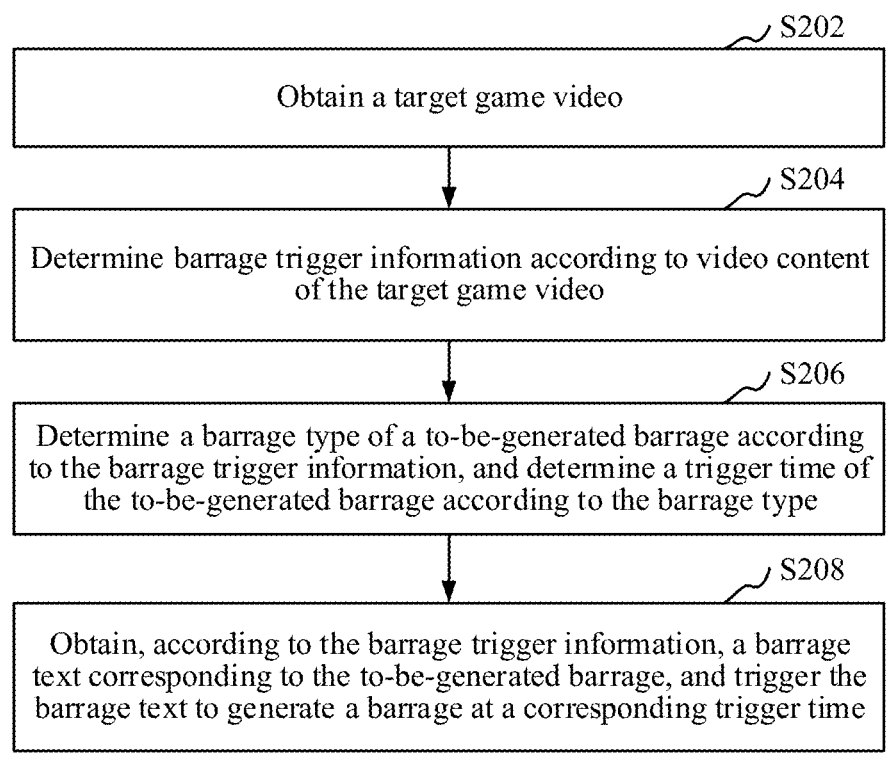
FIG. 2 is a schematic flowchart of a barrage generation method according to one or more embodiments of the present disclosure.

As shown in FIG. 2, in an embodiment, a barrage generation method is provided. In this embodiment, for example, the method is applied to a computing device. The computing device may be the terminal 110 or the server 120 in FIG. 1. Referring to FIG. 2, the barrage generation method may include the following steps:

S202: Obtain a target game video.

The target game video is a game video for which a barrage may need to be generated. The target game video includes but is not limited to an original game video or live broadcast of a game video, for example, the target game video may be a game video related to Glory of the King.

In an embodiment, after receiving a barrage generation instruction, the computing device may determine a video corresponding to the barrage generation instruction as the target game video. In another embodiment, the computing device may select each video from a stored or pre-stored video set in turn and determine the video as the target game video.

S204: Determine barrage trigger information according to video content of the target game video.

The barrage trigger information is information that can trigger barrage generation. After obtaining the target game video, the computing device may understand content of the target game video to determine the barrage trigger information corresponding to the target game video.

In an embodiment, the barrage trigger information may be at least one of a video event, a video element, and a video type. A video event refers to exciting event content, for example, game broadcast or a game screen that a viewer and a player responds to, for example, a player kills a plurality of enemies and death in a game battle. Video elements are some specific elements in a video. For example, in a game video, a video element may be a scene element related to a specific game battle, for example, a protagonist and a prop in the game battle. The video type is a predefined video type of the target game video, for example, when the target game video is a game video, the video type can be Glory of the king, LOL, or the like.

In an embodiment, after obtaining the target game video, the computing device may invoke a preset interface to understand video content of the target game video to determine the barrage trigger information corresponding to the target game video.

In an embodiment, as shown in Table 1 and Table 2, after the video content is read or obtained, the following data may be obtained. Table 1 shows data related to a video event, and Table 2 shows data related to a video element:

TABLE 1

| Event: bloody multiple kills | Main hero: Luban | Time: 01:00 to 01:25 |
| Event: one against one hundred | Main hero: Angela | Time: 01:35 to 01:45 |
| Event: Dragon team battle | Main hero: Angela and Marco | Time: 02:10 to 02:35 |

TABLE 2

| Main hero detection-main hero: Luban | frame_id: frame 2000 |
| Broadcast detection-slogan: five consective peerlessness | frame_id: frame 1000 |
| Grass detection-hidden or not: yes | frame_id: frame 1700 |
| Wild monster detection-type: tyrant | frame_id: frame 1750 |

S206: Determine a barrage type of a to-be-generated barrage according to the barrage trigger information, and determine a trigger time of the to-be-generated barrage according to the barrage type.

The barrage type of the to-be-generated barrage is a specific barrage type of the to-be-generated barrage to be triggered. In this embodiment of the present disclosure, a plurality of barrage types are predefined, and different barrage trigger information triggers barrages of different barrage types. Trigger times corresponding to barrages of different barrage types are determined also in different methods. Therefore, after determining the barrage trigger information, the computing device first may need to determine barrage types of barrages triggered by the barrage trigger information, and then determine a trigger time corresponding to each barrage type according to the barrage types. The trigger time herein refers to a time for triggering a barrage text to generate a barrage. The trigger time may be a time point or a time period.

There may be a plurality of types of barrage trigger information determined according to video content. A barrage type of a to-be-generated barrage is determined according to each type of barrage trigger information, and a trigger time corresponding to a to-be-generated barrage of each barrage type is determined according to each barrage type.

Each type of barrage trigger information determined according to video content may include a plurality of pieces of different information. After a barrage type is determined according to the barrage trigger information, a trigger time corresponding to a to-be-generated barrage triggered by each piece of information is determined according to the barrage type.

In an embodiment, defined or pre-defined barrage types include an event description barrage, an event topic barrage, an element topic barrage, and a popular topic barrage. The event description barrage and the event topic barrage are barrages triggered according to video events, the element topic barrage is a barrage triggered according to a video element, and the popular topic barrage is a barrage triggered according to a video type.

S208: Obtain, according to the barrage trigger information, a barrage text corresponding to the to-be-generated barrage, and trigger the barrage text to generate a barrage in the corresponding trigger time.

The barrage text is text content displayed after a barrage is generated, and the text content includes but is not limited to a text and an emoji.

In an embodiment, a barrage database may be pre-established, and the barrage database stores a mapping relationship between barrage trigger information and a barrage text. The computing device may obtain a corresponding barrage text from the barrage database according to barrage trigger information, and use the obtained barrage text as a barrage text corresponding to the to-be-generated barrage.

After obtaining the barrage text, the computing device triggers the barrage text in a corresponding trigger time, that is, may generate a barrage. The to-be-generated barrage may correspond to a plurality of trigger times. Then, a barrage text corresponding to each trigger time is obtained, and barrage texts are triggered in different trigger times to generate a barrage.

In an embodiment, when the computing device triggers the barrage text to generate the barrage, a font color, a model, thickness, and other display styles of the barrage may be randomly set.

In an embodiment, when the computing device triggers the barrage text to generate the barrage, a barrage track and start and end locations may be randomly selected. The barrage track herein is a path that the barrage may pass through in a video screen. The path may be a straight line, a diagonal line, or a curve.

In an embodiment, when the computing device triggers the barrage text to generate the barrage, a disappearing time point of the barrage may be randomly set, where the disappearing time point is a time at which the barrage disappears in a video frame.

Figure 2A:
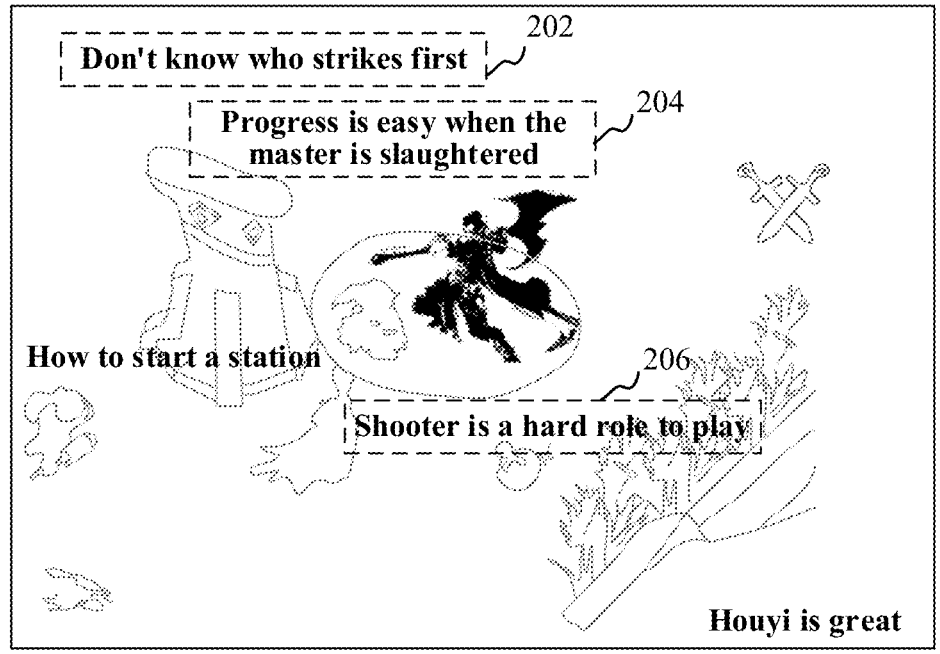
FIG. 2A is a schematic diagram of a display effect of generated barrages according to one or more embodiments of the present disclosure.

FIG. 2A is a schematic diagram of a display effect of generated barrages according to a specific embodiment. "Don't know who strikes first" in a dashed box 202, "progress is easy when the master is slaughtered" in a dashed box 204, "shooter is a hard role to play" in a dashed box 206, and the like are all generated barrages.

In the barrage generation method, after the target game video is obtained, the barrage trigger information is determined according to video content of the target game video; the barrage type of the to-be-generated barrage is determined according to the barrage trigger information, the trigger time corresponding to the to-be-generated barrage is determined according to the barrage type, the barrage text corresponding to the to-be-generated barrage is obtained according to the barrage trigger information, and the barrage text is triggered to generate the barrage in the corresponding trigger time. In this way, the barrage is intelligently generated. After the target game video is obtained, the barrage trigger information is determined according to the video content, and the barrage text is obtained also according to the barrage trigger information. Therefore, the finally generated barrage is strongly correlated to the video content, which improves correlation between the barrage and the video.

In an embodiment, the determining barrage trigger information according to video content of the target game video includes: performing image detection on a video frame corresponding to the target game video, to obtain an image element corresponding to the video frame; and determining the barrage trigger information according to the image element.

The image element is a feature object in a video frame. The feature object herein may include all tangible objects in a video frame, such as human faces, subtitles, decorative props, human bodies, animals, and plants.

In certain embodiments, the computing device may perform image detection on each video frame corresponding to the target game video, identify all feature objects in the video frame, and obtain an image element corresponding to each video frame. An image detection method may be selected according to an actual requirement, for example, an artificial intelligence (AI) image recognition method or other image recognition algorithms. This is not necessarily limited herein in the present disclosure. After the image element is detected, the image element and related information of the image element and the corresponding target game video are stored in a structured database in association with each other. The related information of the image element includes a corresponding time, an identifier of a video frame of the image element, and the like. The computing device further may obtain predefined barrage trigger information, and determine, according to a result of matching between the image element corresponding to the target game video and the predefined barrage trigger information, the barrage trigger information corresponding to the target game video.

In an embodiment, the computer may perform logical combination on image elements corresponding to multiple consecutive video frames, perform matching with each event type in a predefined event type set, and if any event type matches, determine that the target game video includes a video event of the event type, where the video event is the barrage trigger information. Event information corresponding to the determined video event is stored in the database. The event information includes a time period, a character, an event type, and the like corresponding to the event.

In an embodiment, after determining the video event included in the target game video, the computing device performs matching between the video event and an event type corresponding to each game type, and determine a game type with the highest matching degree as a game type corresponding to the target game video. For example, the target game video includes a video event A1 and a video event B1, event types corresponding to a game type A include A, B, and C, and event types corresponding to a game type B include B, C, and D. An event type corresponding to the video event A1 is A, and an event type corresponding to the video event B1 is B. In this implementation, the target game video obviously matches the game type A to a greater extent. The game type A is determined as the video type corresponding to the target game video, and the video type is the barrage trigger information.

In an embodiment, the computing device may perform matching between an image element and each video element type in a predefined video element type set. When at least one image element matches a video element type, the at least one image element is determined as the video element of the target game video, and the video element is the barrage trigger information.

In this embodiment, image detection is performed on the video frame of the target game video, and the barrage trigger information corresponding to the target game video may be more accurately determined according to the detected image element.

In an embodiment, when or in response to determining that the barrage trigger information includes a video event, the determining a barrage type of a to-be-generated barrage according to the barrage trigger information, and determining, according to the barrage type, a trigger time corresponding to the to-be-generated barrage in step S206 includes: determining, according to the video event, that a barrage type of the to-be-generated barrage includes a first barrage type; and using, as the trigger time of the to-be-generated barrage of the first barrage type, a preset time period that starts from a time period corresponding to the video event.

The first barrage type includes at least one of an event description barrage and an event topic barrage. The event description barrage is a barrage related to a specific video event, and content of this type of barrage usually describes or comments a specific event. The event topic barrage is related to a specific video event, but has content that is not limited to the event itself and may be a topic derived from the event to some extent, to simulate an imagined scene of a viewer.

In certain embodiments, when or in response to determining that the barrage trigger information includes a video event, the computing device may determine that the barrage type of the to-be-generated barrage includes the first barrage type. The first barrage type is determined according to the video event and intends to arouse viewer resonance with a specific video event. Therefore, this type of barrage may need to appear along with the event. Therefore, the computing device may obtain a time period corresponding to the video event, and determine a preset time period that starts from the time period as a trigger time of this type of barrage. When there are a plurality of video events, a time period corresponding to each video event may need to be obtained, and a preset time period that starts from a time period corresponding to each video event is used as a trigger time. Because video events are usually different, barrage texts triggered in various trigger times are definitely different.

In an embodiment, when or in response to determining that the barrage type is an event description barrage, the obtaining, according to the barrage trigger information, a barrage text corresponding to the to-be-generated barrage, and triggering the barrage text to generate a barrage in the corresponding trigger time in step S208 includes: determining an event type corresponding to the video event; obtaining a first type of history barrage text corresponding to the event type from barrage database which may be pre-established; using the obtained first type of history barrage text as the barrage text; and triggering the barrage text repeatedly in the corresponding trigger time to generate a barrage.

Figure 3A:
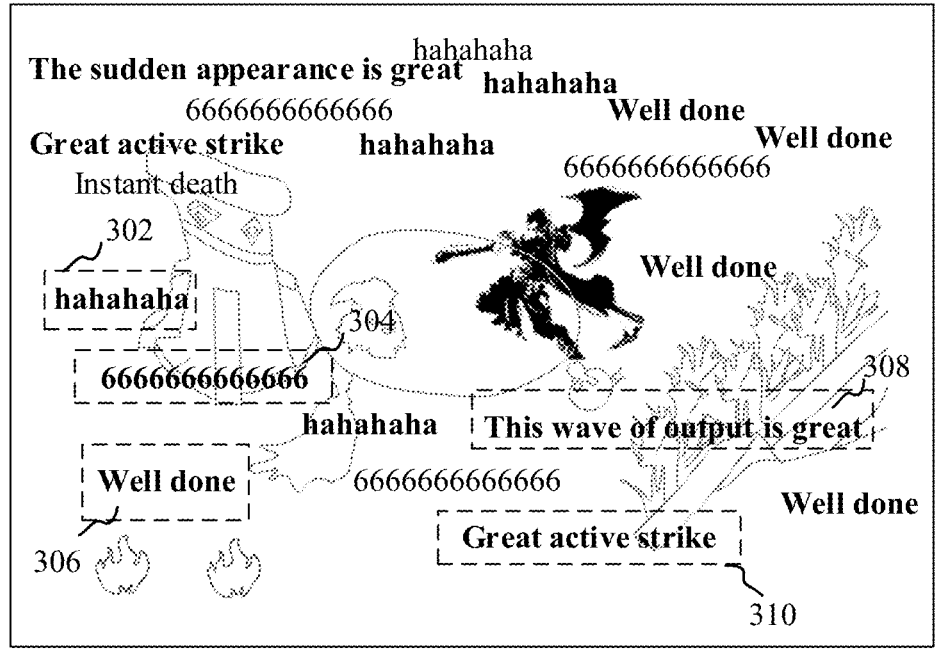
FIG. 3A is a schematic diagram of a display effect corresponding to an event description barrage according to one or more embodiments of the present disclosure.

The first type of history barrage text is a barrage text that appears at a frequency exceeding a preset frequency threshold in a history time period corresponding to the event type. This type of barrage text usually includes a small amount of information, and a barrage generated according to this type of barrage text usually intends to flood a screen, and therefore may also be referred to as a screen flooding barrage. FIG. 3A is a schematic diagram of a display effect corresponding to an event description barrage according to an embodiment. "6666666666666" in a dashed box 304, "well done" in a dashed box 306, "hahahaha" in a dashed box 302, and the like are screen flooding barrages.

Video events are usually different in different videos, but these different video events may belong to the same event type. For example, a protagonist 1 dies in a death event in a video A, and a video B also includes a death event and a protagonist 2 dies. The two death events are different video events, but both the two death events belong to the death event type. Because a barrage generated based on the first type of history barrage text usually intends to flood a screen and a screen flooding barrage includes a small amount of information, this type of barrage is usually similar and may be used universally for the same event type. Based on this, first type of history barrage texts corresponding to event types may be collected in advance. The first type of history barrage texts are obtained by screening barrages of history video events corresponding to event types of other game videos. After the first type of history barrage texts are collected, mapping relationships between the first type of history barrage texts and corresponding event types may be established and stored in the barrage database.

When or in response to determining that the barrage trigger information includes a video event, the computing device may determine that the barrage type includes an event description barrage. To obtain a barrage text corresponding to this type of barrage, the computing device may first determine an event type of a specific video event in the target game video according to the video event, then obtain or randomly obtain a quantity of first type of history barrage texts corresponding to the event type from the barrage database, and use the obtained barrage texts as the barrage text of the to-be-generated barrage. The computing device repeatedly triggers the barrage texts to generate barrages in a preset time period that starts from a time period corresponding to the video event. When the target game video includes a plurality of video events, a corresponding barrage text is obtained based on an event type corresponding to each video event, and the barrage text corresponding to each video event is repeatedly triggered to generate a barrage in a preset time period that starts from a time period corresponding to the video event. Repeatedly triggering herein refers to triggering for a plurality of times, but barrage texts triggered for the plurality of times may be the same or different. A larger quantity of repetition times indicates a smaller time interval at which generation of a barrage is triggered.

In an embodiment, when the first type of barrage text is triggered to generate the barrage, because the generated barrage is related to the video event, a quantity of triggering times may be increased in the time period in which the video event appears. In the subsequent time, as the time progresses, a quantity of triggering times is gradually reduced to create a barrage mood close to a real environment.

In an embodiment, when or in response to determining that the barrage type is an event description barrage, the obtaining, according to the barrage trigger information, a barrage text corresponding to the to-be-generated barrage, and triggering the barrage text to generate a barrage in the corresponding trigger time in step S208 includes: determining an event type corresponding to the video event; obtaining a second type of history barrage text corresponding to the event type from barrage database which may be pre-established; obtaining event information corresponding to the video event, and updating the second type of history barrage text according to the event information, to obtain the barrage text; and triggering the barrage text repeatedly in the corresponding trigger time to generate a barrage.

The second type of history barrage text is a barrage text that describes a history video event corresponding to the event type. This type of barrage text includes a large amount of information, appears at a low frequency, and has content that is rarely repeated, and therefore usually describes a specific video event desirably. The barrage generated based on the second type of history barrage text may be referred to as a specific descriptive barrage. Still referring to FIG. 3A, "this wave of output is great" in a dashed box 308 and "great active strike" in a dashed box 310 are specific descriptive barrages.

In certain embodiments, second type of history barrage texts corresponding to event types may be collected in advance. The second type of history barrage texts are obtained by screening barrages of history video events corresponding to event types of other game videos. After the second type of history barrage texts are collected, mapping relationships between the second type of history barrage texts and corresponding event types may be established and stored in the barrage database.

When or in response to determining that the barrage trigger information includes a video event, the computing device may determine that the barrage type includes an event description barrage. To obtain a barrage text corresponding to this type of barrage, the computing device may first determine an event type of a specific video event in the target game video according to the video event, and then obtain or randomly obtain a quantity of second type of history barrage texts corresponding to the event type from the barrage database. Because a second type of barrage text describes a specific video event desirably, after obtaining the second type of history barrage texts, the computing device may need to update these barrage texts according to specific event information of the video event in the target game video, and perform matching between the obtained barrage texts and the video event in the target game video, to obtain the barrage text of the to-be-generated barrage. During update, content of the second type of history barrage text that describes another video event is replaced with content that describes the video event in the target game video. For example, the second type of history barrage text "great active strike" is replaced with "this camouflaged killing is well done".

In an embodiment, when the second type of barrage text is triggered to generate the barrage, because the generated barrage is related to the video event, a quantity of triggering times may be increased in the time period in which the video event appears. In the subsequent time, as the time progresses, a quantity of triggering times is gradually reduced to create a barrage mood close to a real environment.

In an embodiment, before the obtaining a first type of history barrage text corresponding to the event type from barrage database which may be pre-established, the method further includes: obtaining a preset event type set; obtaining a history barrage text set corresponding to each of preset event types; clustering history barrage texts in each history barrage text set, to obtain at least one clustering cluster corresponding to each event type; and determining, according to a quantity of history barrage texts in at least one clustering cluster corresponding to each event type, the first type of history barrage text corresponding to each event type.

The preset event type set is a set including event types which may be pre-defined. In this embodiment, barrage texts in videos corresponding to game types may be crawled from the website, a preprocessing operation such as cleansing or removing a typo, a garbled symbol, and a placeholder is performed on the barrage texts, and mapping relationships between the preprocessed barrage texts and corresponding event types are established, to obtain a history barrage text set corresponding to each event type.

The computing device may cluster history barrage texts in each history barrage text set, and after clustering, obtain at least one clustering cluster corresponding to each event type. The computing device may count quantities of history barrage texts in clustering clusters corresponding to all event types, and determine at least one clustering cluster in the clustering clusters as the target clustering cluster according to the quantities of history barrage texts. Barrage texts in these target clustering clusters have similar content and appear frequently, and belong to a non-strongly-correlated screen flooding barrage that does not describe an event in detail. Therefore, the computing device may select at least one barrage text from the target clustering cluster and determine the at least one barrage text as the first type of history barrage text corresponding to the event type. During determining of the target clustering cluster according to the quantities of history barrage texts in the clustering clusters, a clustering cluster whose quantity of history barrage texts is greater than a preset threshold may be determined as the target clustering cluster, or the clustering clusters may be sorted according to quantities of history barrage texts, and at least one clustering cluster whose quantity of history barrage texts is large is selected and determined as the target clustering cluster according to a sorting result.

In an embodiment, the computing device clusters history barrage texts in the history barrage text set, and may first input the history barrage texts into a bert model which may be pre-trained to convert the history barrage texts into text vectors, calculate a vector distance between text vectors, and aggregate text vectors between which a vector distance is less than a preset threshold, to cluster the history barrage texts.

In an embodiment, when or in response to determining that the barrage type is an event topic barrage, the obtaining, according to the barrage trigger information, a barrage text corresponding to the to-be-generated barrage, and triggering the barrage text to generate a barrage in the corresponding trigger time includes: determining an event type corresponding to the video event; selecting or randomly selecting a first target topic text corresponding to the event type from the barrage database which may pre-established, and selecting or randomly selecting a first discussion text corresponding to the first target topic text; using the first target topic text and the first discussion text as the barrage text; and in the preset time period that starts from the time period corresponding to the video event, triggering the first target topic text to generate a topic barrage, and triggering the first discussion text to generate a discussion barrage following the topic barrage.

The barrage database, which may be pre-established, stores a mapping relationship between each event type and a corresponding target topic text, and each target topic text corresponds to a plurality of discussion texts. The topic text usually may appear in the form of a problem, and a corresponding discussion text is discussion and response about the problem. For example, a target topic text about a buff event may include "which heroes are suitable for the buff" and "how long is a buff refresh event".

After determining the event type, the computing device may select a corresponding topic list from the barrage database according to the event type, and then select or randomly select at least one topic text as the first target topic text, and select or randomly select some discussion texts from discussion texts corresponding to the first target topic text, to obtain first discussion texts. The first target topic text and the first discussion texts are barrage texts of the event topic barrage triggered by the video event. Because this type of barrage text is correlated with the video event, this type of barrage text is usually triggered when the event occurs, and gradually disappears when the event ends. Therefore, in the preset time period that starts from the time period corresponding to the video event, the computing device may first trigger the first target topic text to generate a topic barrage, and after the topic barrage is sent, trigger the first discussion texts one by one to generate discussion barrages following the topic barrage at time intervals in the subsequent time, where the time intervals may be random time intervals.

In an embodiment, a topic text and a discussion text corresponding to each event type in the barrage database, which may be pre-established, may be constructed in the following manner: firstly, crawling history barrage texts from a network, classifying the history barrage texts into event types, to obtain a history barrage text set corresponding to each event type, selecting event topic barrages from each history barrage text set, selecting key words that appear frequently from these event topic barrages, selecting topic barrages and discussion barrages related to these key words, and after performing word processing such as restatement and polishing on the barrages, using these barrages as a topic text and a discussion text of an event type corresponding to the history barrage text set, and storing these barrages and corresponding event types in the barrage database in association with each other.

In this embodiment, the event topic barrage is generated by obtaining the first target topic text and the first discussion text corresponding to the event type, which may simulate associated thought of a viewer for the event.

In an embodiment, when or in response to determining that the barrage trigger information includes a video element, the determining a barrage type of a to-be-generated barrage according to the barrage trigger information, and determining, according to the barrage type, a trigger time corresponding to the to-be-generated barrage includes: determining, according to the video element, that a barrage type of the to-be-generated barrage includes an element topic barrage; and in the time period corresponding to the target game video, determining a time period as the trigger time of the to-be-generated barrage whose barrage type is the element topic barrage at an interval of a preset time period.

In this embodiment, the target game video is a game video, and the video element is an element, for example, a hero in a scene, a game mode, or a player id that is strongly correlated with a game battle corresponding to the target game video. Because the game battle runs through the entire target game video, the element topic barrage triggered by the video element may theoretically appear at any time point of the target game video. Therefore, in this embodiment, a time period may be determined as the trigger time of the to-be-generated barrage whose barrage type is the element topic barrage at an interval of a preset time period. To be specific, a fixed time interval is preset, and the element topic barrage is generated within a time range at a fixed time interval in the time period corresponding to the target game video. For example, the fixed time interval may be set to three minutes. An element topic barrage may be generated in subsequent two minutes every three minutes in the time period corresponding to the target game video, and then an element topic barrage is generated again in subsequent two minutes at an interval of three minutes, and so on, until the target game video ends.

In an embodiment, when or in response to determining that the barrage trigger information includes a video type, the determining a barrage type of a to-be-generated barrage according to the barrage trigger information, and determining, according to the barrage type, a trigger time corresponding to the to-be-generated barrage includes: determining, according to the video type, that a barrage type of the to-be-generated barrage includes a popular topic barrage; and in the time period corresponding to the target game video, determining a time period as the trigger time of the to-be-generated barrage whose barrage type is the popular topic barrage at an interval of a preset time period.

The video type is a type of the target game video, for example, when the target game video is a game video, the video type may be a corresponding game type. The game type may be defined as needed. When watching a game video, in addition to commenting and discussing an event, an element, or the like in the game, a real viewer sometimes also discusses some daily popular topics related to the game. In this embodiment, to fit this scenario, when obtaining that the barrage trigger information includes a video type, the computing device may determine that the type of the to-be-generated barrage is a popular topic barrage. The popular topic barrage is a barrage simulating discussion of a daily popular topic by a viewer, for example, discussion on topics such as "when is Glory of the King updated recently" and "what new weapons are released".

Because the video type is associated with a video itself, the popular topic barrage triggered by the video type may theoretically appear in any time period of the target game video. In this embodiment, a time period may be determined as the trigger time of the to-be-generated barrage whose barrage type is the popular topic barrage at an interval of a preset time period, to trigger generation of the popular topic barrage according to a specified rule.

In an embodiment, when or in response to determining that the barrage trigger information includes a video type, the determining a barrage type of a to-be-generated barrage according to the barrage trigger information, and determining, according to the barrage type, a trigger time corresponding to the to-be-generated barrage includes: determining, according to the video type, that a barrage type of the to-be-generated barrage includes a popular topic barrage; and determining a time period in the time period corresponding to the target game video other than a trigger time corresponding to the first barrage type as a candidate trigger time of the to-be-generated barrage whose barrage type is the popular topic barrage, to obtain at least one candidate time period; and determining a candidate time period that is of the at least one candidate time period and whose time length exceeds a preset time threshold as the trigger time of the to-be-generated barrage whose barrage type is the popular topic barrage.

Because a time for generating the popular topic barrage triggered by the video type is flexible, to avoid that there is no barrage for a long time in a time period other than the trigger time corresponding to the first barrage type, generation of the popular topic barrage is selectively triggered in the time period other than the trigger time corresponding to the first barrage type. In certain embodiments, the time period other than the trigger time corresponding to the first barrage type may be first determined as a candidate trigger time. Because the target game video usually has a plurality of video events, there are also a plurality of trigger times corresponding to the first barrage type. These trigger times are scattered in different time periods of the target game video, which is equivalent to dividing the time period of the target game video into a plurality of parts. In this way, at least one candidate time period is obtained outside the trigger time corresponding to the first barrage type. The computing device may select a time period having a large time length from the candidate time periods and determine the time period having a large time length as the trigger time of the popular topic barrage. To define the time length, in this embodiment, a time threshold is preset, and a candidate time period whose time length exceeds the time threshold is determined as the trigger time of the popular topic barrage. The time threshold may be adjusted as needed.

In an embodiment, the obtaining, according to the barrage trigger information, a barrage text corresponding to the to-be-generated barrage, and triggering the barrage text to generate a barrage in the corresponding trigger time includes: selecting or randomly selecting a second target topic text corresponding to the barrage trigger information from the barrage database which may be pre-established, and selecting or randomly selecting a second discussion text corresponding to the second target topic text; using the second target topic text and the second discussion text as the barrage text; and triggering the second target topic text to generate a topic barrage in the corresponding trigger time, and triggering the second discussion text to generate a discussion barrage following the topic barrage.

The barrage trigger information includes at least one of a video element and a video type. The barrage database, which may pre-established, stores a mapping relationship between target topic texts corresponding to video elements and video types, and each target topic text corresponds to a plurality of discussion texts.

When obtaining the barrage text corresponding to the to-be-generated barrage, the computing device may select a corresponding topic list from the barrage database according to the barrage trigger information, and then selecting or randomly select at least one topic text as the second target topic text, and select or randomly select some discussion texts from discussion texts corresponding to the second target topic text, to obtain second discussion texts. In the trigger time corresponding to the to-be-generated barrage, the computing device first triggers the second target topic text to generate a topic barrage, and after the topic barrage is sent, trigger the second discussion texts one by one to generate discussion barrages following the topic barrage at time intervals in the subsequent time, where the time intervals may be random time intervals.

Figure 3B:
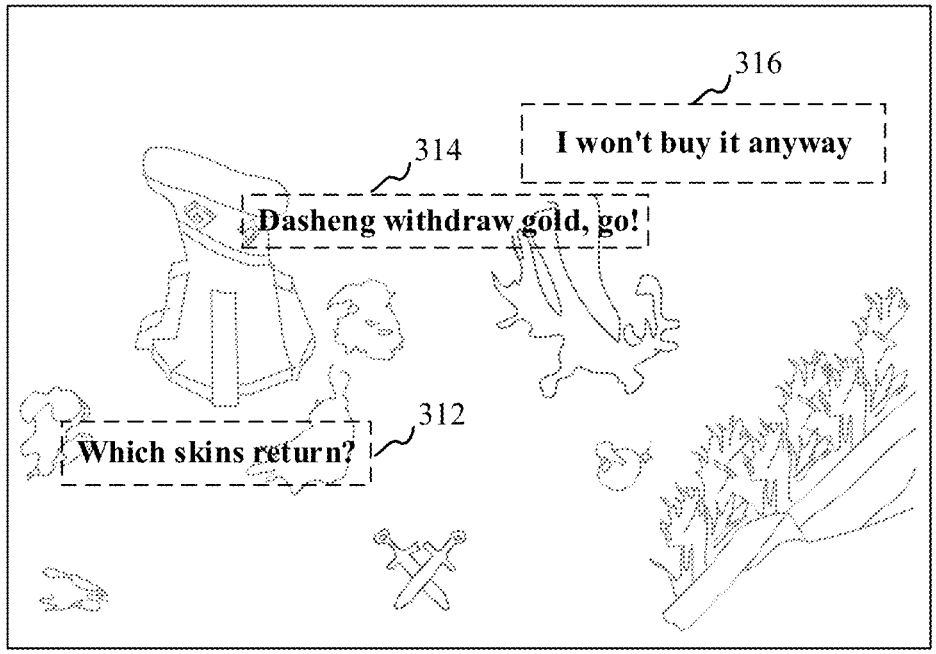
FIG. 3B is a schematic diagram of a display effect of a popular topic barrage according to one or more embodiments of the present disclosure.

FIG. 3B is a schematic diagram of a display effect of a popular topic barrage according to an embodiment. "Which skins return?" in a dashed box 312 is a generated topic barrage, and "Dasheng withdraw gold, go!" in a dashed box 314 and "I won't buy it anyway" in a dashed box 316 are discussion barrages generated following the topic barrage.

Figure 3C:
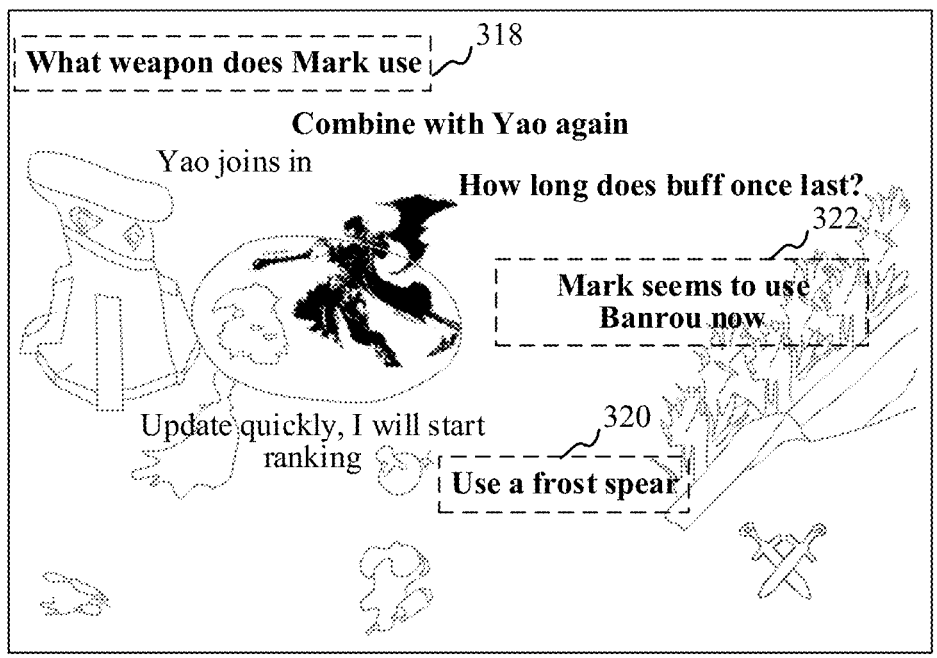
FIG. 3C is a schematic diagram of a display effect of an element topic barrage according to one or more embodiments of the present disclosure.

FIG. 3C is a schematic diagram of a display effect of an element topic barrage according to an embodiment. "What weapon does Mark use" in a dashed box 318 is a generated topic barrage, and "use a frost spear" in a dashed box 320 and "Mark seems to use Banrou now" in a dashed box 322 are discussion barrages generated following the topic barrage.

Because the barrage trigger information includes at least one of a video element and a video type, the trigger time corresponding to the to-be-generated barrage herein is a trigger time determined according to at least one of the video element and the video type. The trigger time may be determined according to the method provided in the embodiment. This is not repeated herein in the present disclosure.

In an embodiment, a topic text and a discussion text corresponding to each video element in the barrage database, which may be pre-established, may be constructed in the following manner: firstly, crawling history barrage texts from a network, classifying the history barrage texts into video elements, to obtain a history barrage text set corresponding to each video element, selecting element topic barrages from each history barrage text set, selecting key words that appear frequently from these element topic barrages, selecting topic barrages and discussion barrages related to these key words, and after performing word processing such as restatement and polishing on the barrages, using these barrages as a topic text and a discussion text of a video element corresponding to the history barrage text set, and storing these barrages and corresponding video elements in the barrage database in association with each other.

Figure 3:
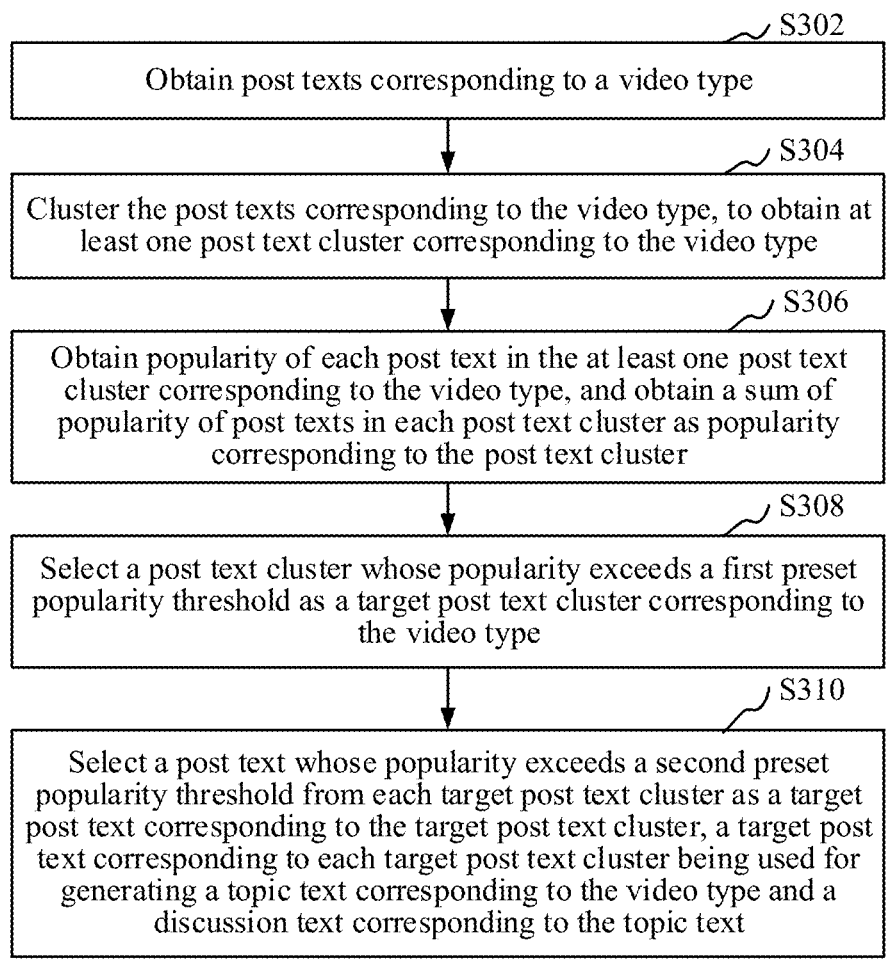
FIG. 3 is a schematic flowchart of constructing a topic text and a discussion text corresponding to a popular topic barrage according to one or more embodiments of the present disclosure.

In an embodiment, as shown in FIG. 3, before the obtaining, according to the barrage trigger information, a barrage text corresponding to the to-be-generated barrage, and triggering the barrage text to generate a barrage in the corresponding trigger time, the barrage generation method further includes a step of constructing a topic text and a discussion text corresponding to a popular topic barrage. This step may include:

S302: Obtain a post text corresponding to a video type.

The post text is a discussion post that discusses a popular topic. For example, the post text may be a discussion post about a popular game topic on a discussion platform such as a game forum and a game post bar.

S304: Cluster the post texts corresponding to the video type, to obtain at least one post text cluster corresponding to the video type.

In certain embodiments, after the post texts are obtained, an organizing operation such as cleansing and preprocessing may be performed on the post texts, then the post texts are converted into text vectors, and the text vectors are clustered to obtain at least one post text cluster. During clustering, a vector distance between text vectors may be calculated and text vectors between which a vector distance is less than a preset threshold are clustered as one type, or cosine similarity between text vectors may be calculated for clustering. Other methods may also be used for clustering. This is not limited herein in the present disclosure.

In an embodiment, a TF-IDF algorithm may be used to obtain a term frequency vector of each organized post text, and the term frequency vector is used as a text vector of each post text.

S306: Obtain popularity of each post text in the at least one post text cluster corresponding to the video type, and obtain a sum of popularity of post texts in each post text cluster as popularity corresponding to the post text cluster.

Popularity is used to represent a degree of attention, and greater popularity indicates a higher degree of attention.

In certain embodiments, popularity of post texts in each post text cluster may be first calculated, then popularity of the post texts in each post text cluster is added to obtain a popularity sum, and the popularity sum is used as popularity corresponding to the post text cluster.

In an embodiment, the popularity of the post text may be calculated based on an indicator such as a quantity of comments, a quantity of replies, and a quantity of views of the post text. In certain embodiments, a weight of each indicator may be preset. Then, the popularity of the post text=a quantity of comments*a weight of comment+a quantity of replies*a weight of reply+a quantity of views*a weight of view+ . . .

S308: Select a post text cluster whose popularity exceeds a first preset popularity threshold as a target post text cluster corresponding to the video type.

S310: Select a post text whose popularity exceeds a second preset popularity threshold from each target post text cluster as a target post text corresponding to the target post text cluster, a target post text corresponding to each target post text cluster being used for generating a topic text corresponding to the video type and a discussion text corresponding to the topic text.

Because the popularity of each post text in the target post text cluster has been obtained in advance, the computing device may select a post text whose popularity exceeds a second preset popularity threshold from each target post text cluster as a target post text corresponding to the target post text cluster. Target post texts may be used to construct a topic text and a discussion text corresponding to the topic text.

In an embodiment, the target post text may be divided, a sub-sentence that meets a requirement is selected from obtained sub-sentences, and restatement is performed through a trained short sentence restatement network to obtain a topic text and a discussion text corresponding to the topic text. The short sentence restatement network may be obtained through training by using an existing model training method.

In this embodiment, the first preset popularity threshold and the second preset popularity threshold may be adjusted according to barrage effects.

In an embodiment, before the triggering the barrage text in the corresponding trigger time to generate a barrage, the barrage generation method further includes: obtaining a current probability distribution function corresponding to the barrage type, and sampling values or random values according to the current probability distribution function, the current probability distribution function being obtained according to a quantity of history users corresponding to the video type of the target game video and a quantity of history barrages corresponding to the barrage type; and the triggering the barrage text to generate a barrage in the corresponding trigger time includes: triggering the barrage text in the corresponding trigger time to generate a barrage when or in response to determining that a random value obtained by sampling is a first value or a first random value.

The probability distribution function is a beta distribution (BD) function. Beta distribution is a probability distribution that includes two parameters. The parameters of beta distribution may be obtained based on prior information. In certain embodiments, in this embodiment, the current probability distribution function is used to represent a trigger probability of a barrage corresponding to a barrage type. Because the target game video has no history data, prior information corresponding to a video type of the target game video may be used as the prior information of the target game video. Therefore, a parameter of the current probability distribution function may be obtained according to a quantity of history users corresponding to the video type of the target game video and a quantity of history barrages corresponding to the barrage type. The quantity of history users may be obtained by counting a quantity of viewers of all videos corresponding to the video type. The quantity of history barrages may be obtained by counting history barrage data that is of all history barrages corresponding to the video type and that corresponds to the barrage type.

When a plurality of barrage types are obtained according to the barrage trigger information, the computing device obtains a current probability distribution function corresponding to each barrage type. The current probability distribution function corresponding to each barrage type is obtained according to a quantity of history users corresponding to the video type of the target game video and a quantity of history barrages corresponding to the barrage type.

After obtaining the current probability distribution function corresponding to the barrage type, the computing device may sample values or random values based on a parameter of the current probability distribution function. Whether the value or the random value obtained by sampling is 0 or 1 depends on the parameter of the current probability distribution function. 1 is a first value or a first random value and 0 is a second value or a second random value. When the value or the random value obtained by sampling is the first random value, the barrage text is triggered to generate a barrage. When the random value obtained by sampling is the second random value, the computing device does not trigger the barrage text, that is, does not generate a barrage. Therefore, barrage generation conforms to an actual trigger probability.

In this embodiment, the current probability distribution function corresponding to the barrage type is obtained, random values are sampled according to the current probability distribution function, and then whether to trigger the barrage may be determined according to the random values obtained by sampling, to follow a barrage generation rule in a real scenario to make a generated barrage more real.

Figure 4:
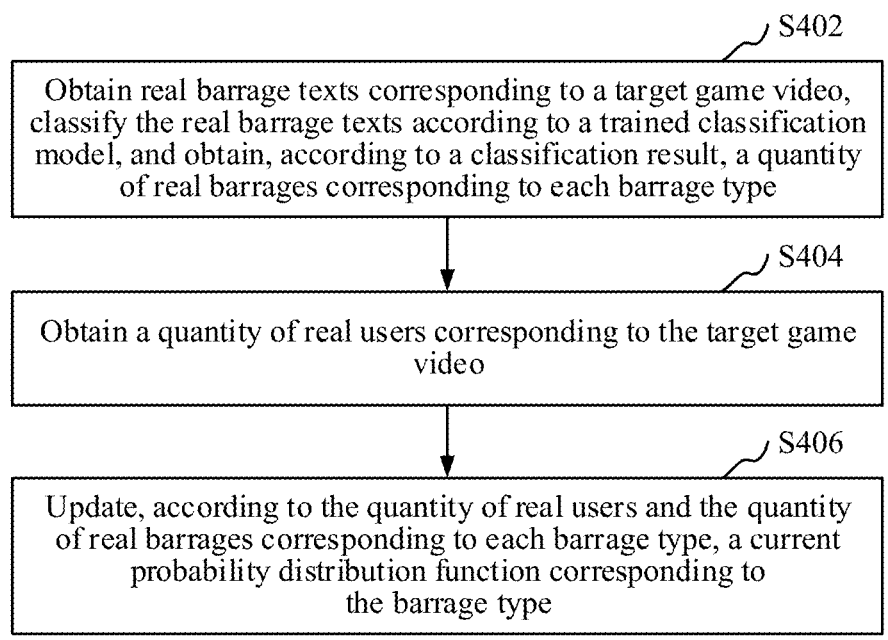
FIG. 4 is a schematic diagram of a procedure after S208 according to one or more embodiments of the present disclosure.

In an embodiment, as shown in FIG. 4, the barrage generation method further includes:

S402: Obtain real barrage texts corresponding to the target game video, classify the real barrage texts according to a trained classification model, and obtain, according to a classification result, a quantity of real barrages corresponding to each barrage type.

The real barrage text is a barrage entered by a user in a real scenario after the target game video is brought online. After obtaining the real barrage texts within a time, a computing device inputs the real barrage texts into the trained classification model, obtains barrage types of the real barrage texts based on the classification result outputted by the classification model, and counts, according to the barrage type of each real barrage text, a quantity of real barrages corresponding to each barrage type. The classification model is a machine learning model for classification, and is trained according to classified history barrage texts. Because barrage types corresponding to the classified history barrage texts are known, supervised training may be performed according to these history barrage texts to obtain the classification model.

S404: Obtain a quantity of real users corresponding to the target game video.

S406: Update, according to the quantity of real users and the quantity of real barrages corresponding to each barrage type, a current probability distribution function corresponding to the barrage type.

The quantity of real users is a quantity of viewers in a real scenario after the target game video is brought online.

After the target game video is brought online, each barrage type has a specific quantity of users and a specific quantity of barrages, that is, has posterior information. Beta distribution is conjugate prior distribution of binomial distribution. When data conforms to binomial distribution, prior distribution and posterior distribution of the parameter can maintain the form of the Beta distribution. Therefore, the current probability distribution function corresponding to each barrage type may be updated according to the posterior information. Updating the current probability distribution function is updating a parameter corresponding to the current probability distribution function, to update a distribution probability triggered by the barrage. After update, it is equivalent to optimizing a barrage generation capability of the computing device. In this way, when the computing device generates a barrage according to the updated current probability distribution function, a barrage generation effect that is closer to a real environment can be achieved.

In an embodiment, the classification model includes a text classification network layer, a fully-connected layer, and a prediction layer, and an operation of training the classification model includes: obtaining a training sample, the training sample including a history barrage text and a target barrage type corresponding to the history barrage text; inputting the history barrage text into the text classification network layer which may be pre-trained, and performing vectorization on the history barrage text through the text classification network layer, which may be pre-trained, to obtain a corresponding text vector; inputting the text vector into the fully-connected layer, and performing classification calculation on the text vector through the fully-connected layer, to obtain a classification eigenvector; inputting the classification eigenvector into the prediction layer to obtain a predicted probability corresponding to each barrage type; and training the classification model according to the predicted probability of each barrage type and the target barrage type.

The text classification network layer, which may be pre-trained, may be implemented by using a bert model which may be pre-trained. During training, after inputting the history barrage text into the bert model which may be pre-trained, the corresponding text vector is outputted. The computing device further inputs the text vector into the fully-connected layer, and the fully-connected layer performs classification calculation on the text vector, to obtain the classification eigenvector. The classification eigenvector includes a probability parameter for classifying the history barrage text into each barrage type. Finally, the computing device inputs the classification eigenvector into the prediction layer to output a specific predicted probability that the history barrage text corresponds to each barrage type. The prediction layer may be implemented by using softmax. Because the barrage type of the history barrage text is known, a loss function may be constructed according to a difference between the predicted probability and a real probability, a parameter of each layer of the classification model is adjusted to minimize the loss function, and training continues until a training end condition is satisfied. The training end condition herein may be: a training time exceeds a preset duration, a quantity of parameter adjustment times exceeds a preset quantity of times, and a difference between the predicted probability and the real probability is less than a preset difference threshold.

Figure 5:
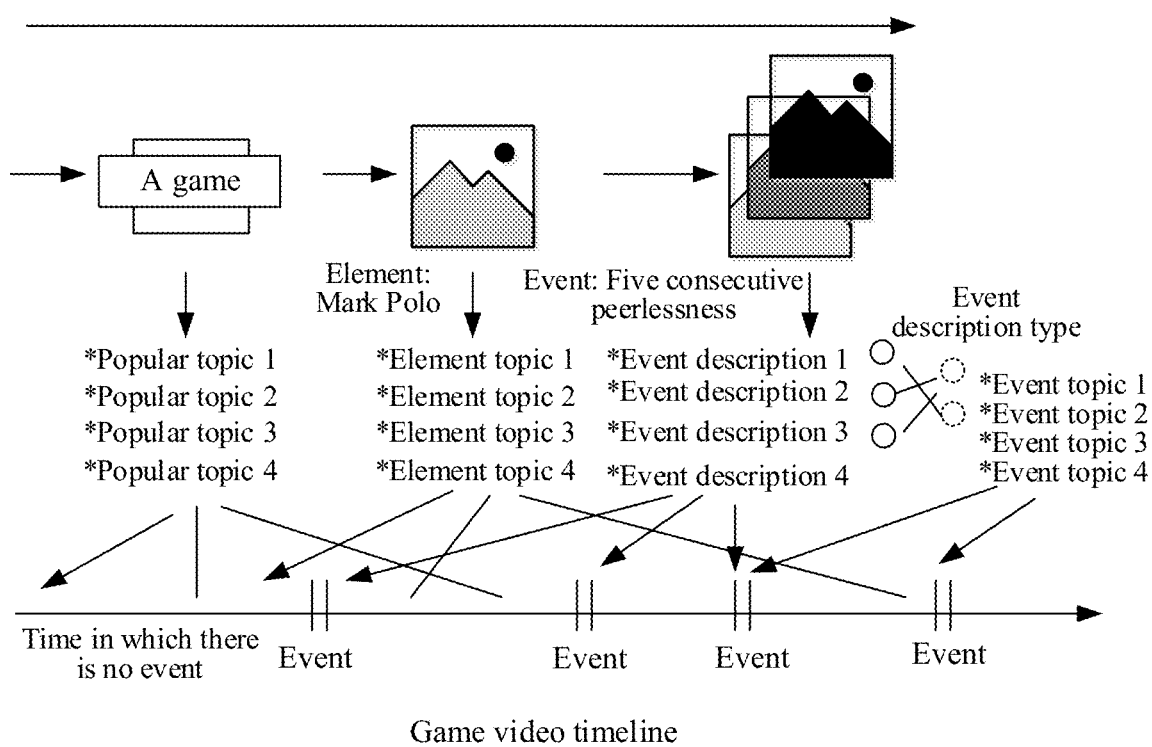
FIG. 5 is a schematic flowchart of a barrage generation method according to one or more embodiments of the present disclosure.

In a specific embodiment, an example in which the target game video is a video related to Glory of the King is used to illustrate the barrage generation method of the present disclosure. After understanding the target game video, the computing device determines that a video element of the target game video includes "Mark Polo" and a video event includes "five consecutive peerless". Based on the game type "Glory of the King" of the target game video, a plurality of topic texts corresponding to Glory of the King may be randomly selected from the barrage database, for example, topic texts indicated by a popular topic 1, a popular topic 2, a popular topic 3, and a popular topic 4 in FIG. 5. Based on a video element corresponding to the game video, a plurality of topic texts may be randomly selected from the barrage database, for example, topic texts indicated by an element topic 1, an element topic 2, an element topic 3, and an element topic 4 in FIG. 5. Based on an event type of the video event included in the game video, a plurality of event description texts may be randomly selected from the barrage database, for example, texts indicated by an event description 1, an event description 2, an event description 3, and an event description 4 in FIG. 5. The event description texts may be the first type of history barrage text or the second type of history barrage text. Based on the event type of the video event included in the game video, a plurality of topic texts may be randomly selected from the barrage database, for example, topic texts indicated by an event topic 1, an event topic 2, an event topic 3, and an event topic 4 in FIG. 5. Still referring to FIG. 5, texts related to the video event, for example, the event description 1, the event description 2, the event description 3, and the event description 4, and the event topic 1, the event topic 2, the event topic 3, and the event topic 4 start to be triggered to generate barrages in a time period in which an event occurs. Texts related to the video element, for example, the element topic 1, the element topic 2, the element topic 3, and the element topic 4, and texts related to the game type, for example, the popular topic 1, the popular topic 2, the popular topic 3, and the popular topic 4, are triggered in a time period in which no event occurs.

Figure 6:
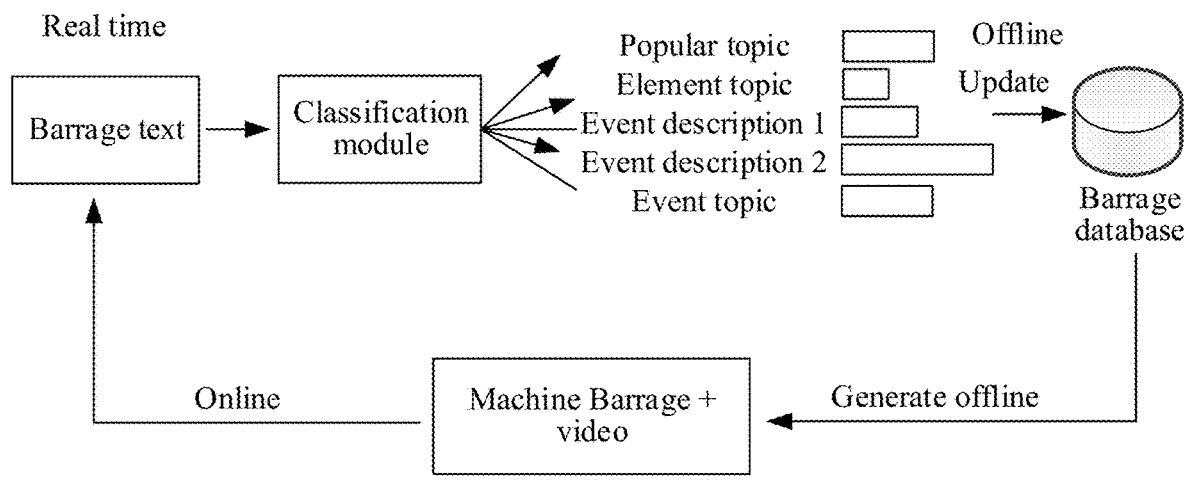
FIG. 6 is a schematic diagram of generation logic corresponding to a barrage generation method according to one or more embodiments of the present disclosure.

FIG. 6 is a diagram of generation logic corresponding to offline barrage generation by a computing device according to an embodiment. When the target game video is promoted at the initial stage, due to lack of sufficient real barrage data, the computing device may generate various machine barrages of the target game video offline based on various barrage texts stored in the barrage database. After the target game video is brought online, in a real scenario, a user enters barrage texts in real time, and the computing device performs classification with a trained classification model after obtaining the barrage texts. Barrage types obtained by classification include a total of five barrage types: a popular topic, an element topic, the event description 1, the event description 2, and an event topic. The popular topic type is the popular topic barrage, the element topic type is the element topic barrage, the event topic is the event topic barrage, the event description 1 is the scroll barrage, and the event description 2 is the specific descriptive barrage. After the classification is performed, the classified barrages are stored in the barrage database and are associated with corresponding barrage types. In this way, it is equivalent to updating barrage texts of various barrages in the barrage database. When generating a barrage offline for a next time, the computing device may generate various types of barrages based on the updated barrage database, so that a barrage generated by the computing device is closer to a real environment.

Although the steps in the flowcharts of FIG. 2 to FIG. 4 are sequentially displayed according to directions of arrows, the steps are not necessarily sequentially executed in an order indicated by the arrows. Unless there is a clear description in the present disclosure, an order for executing the steps is not strictly limited, and the steps may be executed in another order. Moreover, at least some steps in FIG. 2 to FIG. 4 may include a plurality of sub-steps or a plurality of stages. These sub-steps or stages are not necessarily executed at the same time, and instead may be performed at different moments. These sub-steps or stages are not necessarily sequentially executed, and instead these sub-steps or stages and at least some of other steps or sub-steps of other steps or other stages may be executed in turn or alternately.

Figure 7:
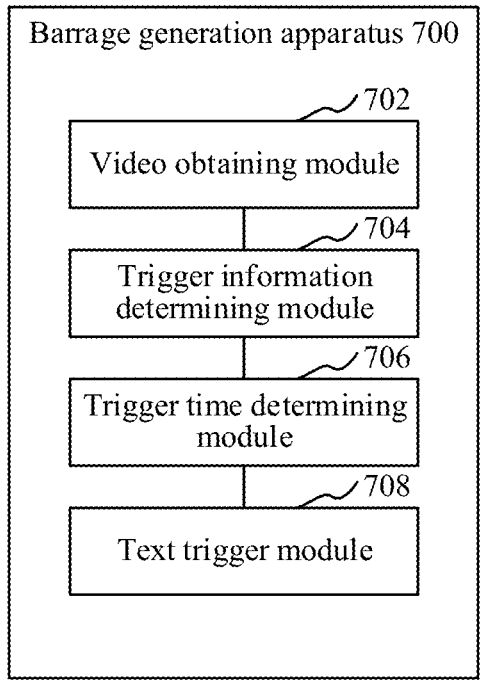
FIG. 7 is a schematic structural block diagram of a barrage generation apparatus according to one or more embodiments of the present disclosure.

In an embodiment, as shown in FIG. 7, a barrage generation apparatus 700 is provided, and the apparatus includes:

a video obtaining module 702, configured to obtain a target game video;

a trigger information determining module 704, configured to determine barrage trigger information according to video content of the target game video;

a trigger time determining module 706, configured to: determine a barrage type of a to-be-generated barrage according to the barrage trigger information, and determine a trigger time of the to-be-generated barrage according to the barrage type; and a text trigger module 708, configured to: obtain, according to the barrage trigger information, a barrage text corresponding to the to-be-generated barrage, and trigger the barrage text to generate a barrage in the corresponding trigger time.

After the target game video is obtained, the barrage generation apparatus determines the barrage trigger information according to video content of the target game video; determines the barrage type of the to-be-generated barrage according to the barrage trigger information, determines, according to the barrage type, the trigger time corresponding to the to-be-generated barrage, obtains, according to the barrage trigger information, the barrage text corresponding to the to-be-generated barrage, and triggers the barrage text to generate the barrage in the corresponding trigger time. In this way, the barrage is intelligently generated. After the target game video is obtained, the barrage trigger information is determined according to the video content, and the barrage text is obtained also according to the barrage trigger information. Therefore, the finally generated barrage is strongly correlated to the video content, which improves correlation between the barrage and the video.

In an embodiment, the trigger information determining module is further configured to: perform image detection on a video frame corresponding to the target game video, to obtain an image element corresponding to the video frame; and determine the barrage trigger information according to the image element.

In an embodiment, when or in response to determining that the barrage trigger information includes a video event, the trigger time determining module is further configured to: determine, according to the video event, that a barrage type of the to-be-generated barrage includes a first barrage type, the first barrage type including at least one of an event description barrage and an event topic barrage; and use, as the trigger time of the to-be-generated barrage of the first barrage type, a preset time period that starts from a time period corresponding to the video event.

In an embodiment, when or in response to determining that the barrage type is an event description barrage, the text trigger module is further configured to: determine an event type corresponding to the video event; obtain a first type of history barrage text corresponding to the event type from barrage database which may be pre-established, the first type of history barrage text being a barrage text that appears at a frequency exceeding a preset frequency threshold in a history time period corresponding to the event type; use the obtained first type of history barrage text as the barrage text; and trigger the barrage text repeatedly in the corresponding trigger time to generate a barrage.

In an embodiment, when or in response to determining that the barrage type is an event description barrage, the text trigger module is further configured to: determine an event type corresponding to the video event; obtain a second type of history barrage text corresponding to the event type from the barrage database which may be pre-established, the second type of history barrage text being a barrage text that describes a history video event corresponding to the event type; obtain event information corresponding to the video event, and update the second type of history barrage text according to the event information, to obtain the barrage text; and trigger the barrage text repeatedly in the corresponding trigger time to generate a barrage.

Figure 8:
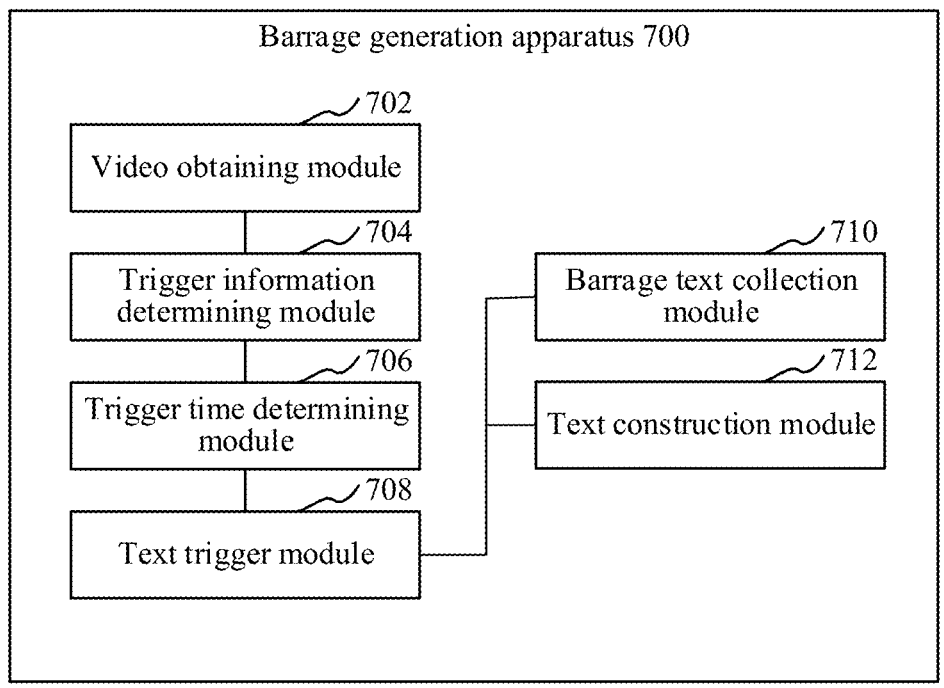
FIG. 8 is a schematic structural block diagram of a barrage generation apparatus according to one or more embodiments of the present disclosure.

In an embodiment, as shown in FIG. 8, the barrage generation apparatus also includes a barrage text collection module 710, configured to: obtain a preset event type set; obtain a history barrage text set corresponding to each of preset event types; cluster history barrage texts in each history barrage text set, to obtain at least one clustering cluster corresponding to each event type; and determine, according to a quantity of history barrage texts in at least one clustering cluster corresponding to each event type, the first type of history barrage text corresponding to each event type.

In an embodiment, when or in response to determining that the barrage type is an event topic barrage, the text trigger module is further configured to: determine an event type corresponding to the video event; randomly select a first target topic text corresponding to the event type from the barrage database which may be pre-established, and randomly select a first discussion text corresponding to the first target topic text; use the first target topic text and the first discussion text as the barrage text; and in the preset time period that starts from the time period corresponding to the video event, trigger the first target topic text to generate a topic barrage, and trigger the first discussion text to generate a discussion barrage following the topic barrage.

In an embodiment, when or in response to determining that the barrage trigger information includes a video element, the trigger time determining module is further configured to: determine, according to the video element, that a barrage type of the to-be-generated barrage includes an element topic barrage; and in the time period corresponding to the target game video, determine a time period as the trigger time of the to-be-generated barrage whose barrage type is the element topic barrage at an interval of a preset time period.

In an embodiment, when or in response to determining that the barrage trigger information includes a video type, the trigger time determining module is further configured to: determine, according to the video type, that a barrage type of the to-be-generated barrage includes a popular topic barrage; and in the time period corresponding to the target game video, determine a time period as the trigger time of the to-be-generated barrage whose barrage type is the popular topic barrage at an interval of a preset time period.

In an embodiment, when or in response to determining that the barrage trigger information includes a video type, the trigger time determining module is further configured to: determine, according to the video type, that a barrage type of the to-be-generated barrage includes a popular topic barrage; and determine a time period in the time period corresponding to the target game video other than a trigger time corresponding to the first barrage type as a candidate trigger time of the to-be-generated barrage whose barrage type is the popular topic barrage, to obtain at least one candidate time period; and determine a candidate time period that is of the at least one candidate time period and whose time length exceeds a preset time threshold as the trigger time of the to-be-generated barrage whose barrage type is the popular topic barrage.

In an embodiment, the text trigger module is further configured to: randomly select a second target topic text corresponding to the barrage trigger information from the barrage database which may be pre-established, and randomly select a second discussion text corresponding to the second target topic text; use the second target topic text and the second discussion text as the barrage text; and trigger the second target topic text to generate a topic barrage in the corresponding trigger time, and trigger the second discussion text to generate a discussion barrage following the topic barrage.

In an embodiment, as shown in FIG. 8, the barrage generation apparatus further includes a text construction module 712, configured to: obtain post texts corresponding to the video type; cluster the post texts corresponding to the video type, to obtain at least one post text cluster corresponding to the video type; obtain popularity of each post text in the at least one post text cluster corresponding to the video type, and obtain a sum of popularity of post texts in each post text cluster as popularity corresponding to the post text cluster; select a post text cluster whose popularity exceeds a first preset popularity threshold as a target post text cluster corresponding to the video type; and select a post text whose popularity exceeds a second preset popularity threshold from each target post text cluster as a target post text corresponding to the target post text cluster, a target post text corresponding to each target post text cluster being used for generating a topic text corresponding to the video type and a discussion text corresponding to the topic text.

Figure 9:
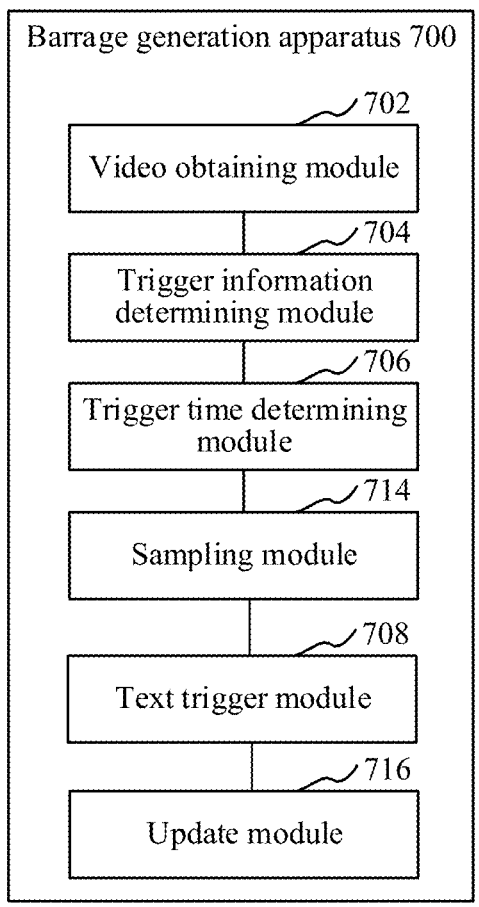
FIG. 9 is a schematic structural block diagram of a barrage generation apparatus according to one or more embodiments of the present disclosure.

In an embodiment, as shown in FIG. 9, the barrage generation apparatus further includes a sampling module 714, configured to: obtain a current probability distribution function corresponding to the barrage type, and sample random values according to the current probability distribution function, the current probability distribution function being obtained according to a quantity of history users corresponding to the video type of the target game video and a quantity of history barrages corresponding to the barrage type. The text trigger module is further configured to trigger the barrage text in the corresponding trigger time to generate a barrage when or in response to determining that a random value obtained by sampling is a first random value.

In an embodiment, as shown in FIG. 9, the barrage generation apparatus further includes an update module 716, configured to: obtain real barrage texts corresponding to the target game video, classify the real barrage texts according to a trained classification model, and obtain, according to a classification result, a quantity of real barrages corresponding to each barrage type; obtain a quantity of real users corresponding to the target game video; and update, according to the quantity of real users and the quantity of real barrages corresponding to each barrage type, a current probability distribution function corresponding to the barrage type.

In an embodiment, the classification model includes a text classification network layer, a fully-connected layer, and a prediction layer. As shown in FIG. 9, the barrage generation apparatus further includes a training module, configured to: obtain a training sample, the training sample including a history barrage text and a target barrage type corresponding to the history barrage text; input the history barrage text into the text classification network layer which may be pre-trained, and perform vectorization on the history barrage text through the text classification network layer which may be pre-trained, to obtain a corresponding text vector; input the text vector into the fully-connected layer, and perform classification calculation on the text vector through the fully-connected layer, to obtain a classification eigenvector; input the classification eigenvector into the prediction layer to obtain a predicted probability corresponding to each barrage type; and train the classification model according to the predicted probability of each barrage type and the target barrage type, until a training condition is satisfied.

Figure 10:
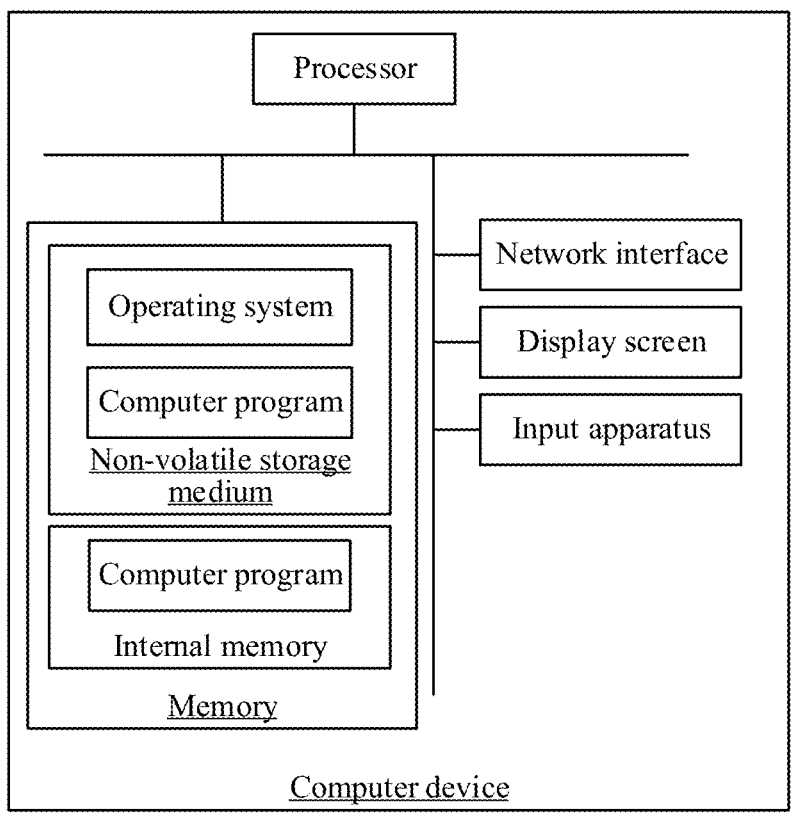
FIG. 10 is a schematic structural block diagram of a computing device according to one or more embodiments of the present disclosure.

FIG. 10 is a diagram of an internal structure of a computing device according to an embodiment. The computing device may be in certain embodiments the terminal 110 (or the server 120) in FIG. 1. As shown in FIG. 10, the computing device includes a processor, a memory, a network interface, an input apparatus, and a display screen that are connected through a system bus. The memory includes a non-volatile storage medium and an internal memory. The non-volatile storage medium of the computing device stores an operating system, and may further store computer-readable instructions. The computer-readable instructions, when executed by the processor, may cause the processor to perform the barrage generation method. The internal memory may further store computer-readable instructions. The computer-readable instructions, when executed by the processor, may cause the processor to perform the barrage generation method. The display screen of the computing device may be a liquid crystal display or an e-ink display. The input apparatus of the computing device may be a touch layer covering the display screen, or may be a button, a trackball, or a touch pad provided on a housing of the computing device, or may be a keyboard, a touch pad, or a mouse that is externally connected.

A person skilled in the art may understand that the structure shown in FIG. 10 is only a block diagram of a part of the structure related to the solution of the present disclosure, and does not constitute a limitation on the computing device to which the solution of the present disclosure is applied. A specific computing device may include more or fewer components than those shown in the figure, or combine some components, or have different component arrangements.

In an embodiment, the barrage generation apparatus provided in the present disclosure may be implemented in a form of computer-readable instructions, and the computer-readable instructions may run on the computing device shown in FIG. 10. The memory of the computing device may store various program modules that form the barrage generation apparatus, for example, the video obtaining module, the trigger information determining module, the trigger time determining module, and the text trigger module shown in FIG. 7. The computer-readable instructions formed by program modules cause the processor to execute the steps of the barrage generation method in each embodiment of the present disclosure described in the present disclosure.

For example, the computing device shown in FIG. 10 may execute S202 through the video obtaining module in the barrage generation apparatus shown in FIG. 7. The computing device may execute S204 through the trigger information determining module. The computing device may execute S206 through the trigger time determining module. The computing device may execute S208 through the text trigger module.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

An embodiment provides a computing device, including a memory and a processor, the memory storing computer-readable instructions, the computer-readable instructions, when executed by a processor, causing the processor to perform steps of the barrage generation method. The steps of the barrage generation method may be the steps of the barrage generation method of each of the embodiments.

An embodiment provides a computer-readable storage medium, storing computer-readable instructions, the computer-readable instructions, when executed by a processor, causing the processor to perform steps of the barrage generation method. The steps of the barrage generation method may be the steps of the barrage generation method of each of the embodiments.

A person of ordinary skill in the art may understand that all or some procedures in the methods in the embodiments may be implemented by a computer-readable instruction instructing relevant hardware. The program may be stored in a non-volatile computer-readable storage medium. When the program is executed, the procedures of the method embodiments may be implemented. Any reference to a memory, a storage, a database, or another medium used in the embodiments provided in the present disclosure can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

Technical features of the embodiments may be randomly combined. To make description concise, not all possible combinations of the technical features in the embodiments are described. However, the combinations of these technical features shall be considered as falling within the scope recorded by the present disclosure provided that no conflict exists.

The embodiments show only several implementations of the present disclosure and are described in detail, which, however, are not to be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the present disclosure is subject to the protection scope of the appended claims.

What is claimed is:

1. A barrage generation method, executed by a computing device, the method comprising:
   obtaining a target game video;
   determining barrage trigger information according to video content of the target game video, the barrage trigger information including a video event;
   determining a barrage type of a barrage according to the barrage trigger information, and determining a trigger time of the barrage according to the barrage type, comprising:
      using, as the trigger time of the barrage, a preset time period that starts from a time period corresponding to the video event; and
   obtaining, according to the barrage trigger information, a barrage text corresponding to the barrage, and triggering the barrage text to generate the barrage at the trigger time.

2. The method according to claim 1, wherein determining the barrage trigger information according to the video content of the target game video comprises:
   performing image detection on a video frame corresponding to the target game video, to obtain an image element corresponding to the video frame; and
   determining the barrage trigger information according to the image element.

3. The method according to claim 1, wherein determining the barrage type of the barrage and determining the trigger time of the barrage comprises:
   determining, according to the video event, that the barrage type of the barrage includes a first barrage type, the first barrage type including at least one of an event description barrage and an event topic barrage; and
   using, as the trigger time of the barrage of the first barrage type, the preset time period that starts from the time period corresponding to the video event.

4. The method according to claim 3, wherein the barrage type is an event description barrage, and wherein obtaining the barrage text and triggering the barrage text to generate the barrage comprises:
   determining an event type corresponding to the video event;
   obtaining a first type of history barrage text corresponding to the event type from a barrage database, the first type of history barrage text being a barrage text that appears at a frequency exceeding a preset frequency threshold in a history time period corresponding to the event type;
   using the first type of history barrage text as the barrage text; and
   triggering the barrage text at the corresponding trigger time to generate the barrage.

5. The method according to claim 3, wherein the barrage type is an event description barrage, and wherein obtaining the barrage text and triggering the barrage text to generate the barrage comprises:
   determining an event type corresponding to the video event;
   obtaining a second type of history barrage text corresponding to the event type from a barrage database, the second type of history barrage text being a barrage text that describes a history video event corresponding to the event type;

obtaining event information corresponding to the video event, and updating the second type of history barrage text according to the event information, to obtain the barrage text; and triggering the barrage text at the trigger time to generate the barrage.

6. The method according to claim 4, further comprising:
obtaining a preset event type set;
obtaining a history barrage text set corresponding to the preset event type set;
clustering history barrage texts in the history barrage text set, to obtain at least one clustering cluster corresponding to the preset event type set; and
determining, according to a quantity of history barrage texts in at least one clustering cluster corresponding to each event type, the first type of history barrage text corresponding to each event type.

7. The method according to claim 3, wherein the barrage type is an event topic barrage, and wherein obtaining the barrage text and triggering the barrage text to generate the barrage comprises:
determining an event type corresponding to the video event;
selecting a first target topic text corresponding to the event type from a barrage database, and selecting a first discussion text corresponding to the first target topic text;
using the first target topic text and the first discussion text as the barrage text; and
in the preset time period that starts from the time period corresponding to the video event, triggering the first target topic text to generate a topic barrage, and triggering the first discussion text to generate a discussion barrage following the topic barrage.

8. The method according to claim 1, wherein the barrage trigger information includes a video element, and wherein determining the barrage type of the barrage and determining the trigger time of the barrage comprises:
determining, according to the video element, that a barrage type of the barrage includes an element topic barrage; and
in the time period corresponding to the target game video, determining a time period as the trigger time of the barrage whose barrage type is the element topic barrage at an interval of a preset time period.

9. The method according to claim 1, wherein the barrage trigger information includes a video type, and wherein determining the barrage type of the barrage and determining the trigger time of the barrage comprises:
determining, according to the video type, that the barrage type of the barrage includes a popular topic barrage; and
in the time period corresponding to the target game video, determining a time period as the trigger time of the to-be-generated barrage whose barrage type is the popular topic barrage at an interval of a preset time period.

10. The method according to claim 3, wherein the barrage trigger information includes a video type, and wherein determining the barrage type of the barrage and determining the trigger time of the barrage comprises:
determining, according to the video type, that the barrage type of the barrage includes a popular topic barrage; and
determining a time period in the time period corresponding to the target game video other than a trigger time corresponding to the first barrage type as a candidate trigger time of the barrage whose barrage type is the popular topic barrage, to obtain at least one candidate time period; and
determining a candidate time period that is of the at least one candidate time period and whose time length exceeds a preset time threshold as the trigger time of the to-be-generated barrage whose barrage type is the popular topic barrage.

11. The method according to claim 8, wherein obtaining the barrage text and triggering the barrage text to generate the barrage comprises:
selecting a second target topic text corresponding to the barrage trigger information from the barrage database, and selecting a second discussion text corresponding to the second target topic text;
using the second target topic text and the second discussion text as the barrage text; and
triggering the second target topic text to generate a topic barrage in the corresponding trigger time, and triggering the second discussion text to generate a discussion barrage following the topic barrage.

12. The method according to claim 9, further comprising:
obtaining post texts corresponding to the video type;
clustering the post texts corresponding to the video type, to obtain at least one post text cluster corresponding to the video type;
obtaining popularity of each post text in the at least one post text cluster corresponding to the video type, and obtaining a sum of popularity of post texts in each post text cluster as popularity corresponding to the post text cluster;
selecting a post text cluster whose popularity exceeds a first preset popularity threshold as a target post text cluster corresponding to the video type; and
selecting a post text whose popularity exceeds a second preset popularity threshold from each target post text cluster as a target post text corresponding to the target post text cluster, a target post text corresponding to each target post text cluster being used to generate a topic text corresponding to the video type and a discussion text corresponding to the topic text.

13. The method according to claim 1, further comprising:
obtaining a current probability distribution function corresponding to the barrage type, and sampling random values according to the current probability distribution function, the current probability distribution function being obtained according to a quantity of history users corresponding to the video type of the target game video and a quantity of history barrages corresponding to the barrage type; and
wherein triggering the barrage text to generate the barrage comprises: triggering the barrage text in the corresponding trigger time to generate a barrage in response to determining that a random value obtained by sampling is a first random value.

14. The method according to claim 13, further comprising:
obtaining real barrage texts corresponding to the target game video, classifying the real barrage texts according to a trained classification model, and obtaining, according to a classification result, a quantity of real barrages corresponding to each barrage type;
obtaining a quantity of real users corresponding to the target game video; and
updating, according to the quantity of real users and the quantity of real barrages corresponding to each barrage type, a current probability distribution function corresponding to the barrage type.

15. The method according to claim 14, wherein the classification model includes a text classification network layer, a fully-connected layer, and a prediction layer, and an operation of training the classification model comprises:
obtaining a training sample, the training sample comprising a history barrage text and a target barrage type corresponding to the history barrage text;
inputting the history barrage text into the text classification network layer, and performing vectorization on the history barrage text through the text classification network layer, to obtain a corresponding text vector;
inputting the text vector into the fully-connected layer, and performing classification calculation on the text vector through the fully-connected layer, to obtain a classification eigenvector;
inputting the classification eigenvector into the prediction layer to obtain a predicted probability corresponding to each barrage type; and
training the classification model according to the predicted probability of each barrage type and the target barrage type.

16. A barrage generation apparatus, comprising: a memory storing computer program instructions; and a processor coupled to the memory and configured to execute the computer program instructions and perform:
obtaining a target game video;
determining barrage trigger information according to video content of the target game video, the barrage trigger information including a video event;
determining a barrage type of a barrage according to the barrage trigger information, and determining a trigger time of the barrage according to the barrage type, comprising:
using, as the trigger time of the barrage, a preset time period that starts from a time period corresponding to the video event; and
obtaining, according to the barrage trigger information, a barrage text corresponding to the barrage, and triggering the barrage text to generate the barrage at the trigger time.

17. The barrage generation apparatus according to claim 16, wherein determining the barrage trigger information according to the video content of the target game video includes:
performing image detection on a video frame corresponding to the target game video, to obtain an image element corresponding to the video frame; and
determining the barrage trigger information according to the image element.

18. The barrage generation apparatus according to claim 16, wherein determining the barrage type of the barrage and determining the trigger time of the barrage includes:
determining, according to the video event, that the barrage type of the barrage includes a first barrage type, the first barrage type including at least one of an event description barrage and an event topic barrage; and
using, as the trigger time of the barrage of the first barrage type, the preset time period that starts from the time period corresponding to the video event.

19. The barrage generation apparatus according to claim 18, wherein the barrage type is an event description barrage, and wherein obtaining the barrage text and triggering the barrage text to generate the barrage includes:
determining an event type corresponding to the video event;
obtaining a first type of history barrage text corresponding to the event type from a barrage database, the first type of history barrage text being a barrage text that appears at a frequency exceeding a preset frequency threshold in a history time period corresponding to the event type;
using the first type of history barrage text as the barrage text; and
triggering the barrage text at the corresponding trigger time to generate the barrage.

20. A non-transitory computer-readable storage medium storing computer program instructions executable by at least one processor to perform:
obtaining a target game video;
determining barrage trigger information according to video content of the target game video, the barrage trigger information including a video event;
determining a barrage type of a barrage according to the barrage trigger information, and determining a trigger time of the barrage according to the barrage type, comprising:
using, as the trigger time of the barrage, a preset time period that starts from a time period corresponding to the video event; and
obtaining, according to the barrage trigger information, a barrage text corresponding to the barrage, and triggering the barrage text to generate the barrage at the trigger time.

\* \* \* \* \*